United States Patent
Masri

(10) Patent No.: US 9,288,297 B2
(45) Date of Patent: Mar. 15, 2016

(54) METHOD AND APPARATUS TO DISPLAY SIGNAL STRENGTH

(75) Inventor: Bassam Masri, Cypress Valley, DC (US)

(73) Assignee: QUALCOMM Incorporated, San Diego, CA (US)

( * ) Notice: Subject to any disclaimer, the term of this patent is extended or adjusted under 35 U.S.C. 154(b) by 1026 days.

(21) Appl. No.: 11/932,577

(22) Filed: Oct. 31, 2007

(65) Prior Publication Data

US 2009/0111526 A1    Apr. 30, 2009

(51) Int. Cl.
*H04M 1/00* (2006.01)
*H04M 1/725* (2006.01)
*H04B 17/318* (2015.01)
*H04B 17/23* (2015.01)

(52) U.S. Cl.
CPC ......... *H04M 1/72519* (2013.01); *H04B 17/318* (2015.01); *H04B 17/23* (2015.01)

(58) Field of Classification Search
CPC .. H04M 1/72519; H04B 17/318; H04B 17/23
USPC ........ 455/434, 566, 552.1, 553.1, 156.1, 423, 455/425, 67.7, 67.11, 115.4, 154.1, 455/157.1–158.5, 226.1–226.4
See application file for complete search history.

(56) References Cited

U.S. PATENT DOCUMENTS

| 6,134,445 | A | 10/2000 | Gould et al. |
| 7,577,453 | B2 * | 8/2009 | Matta ................. H04L 47/10 370/310 |
| 2005/0152304 | A1 * | 7/2005 | Park ................... H04W 88/02 370/328 |
| 2007/0015546 | A1 | 1/2007 | Ito |
| 2007/0281711 | A1 * | 12/2007 | Matta ......................... 455/453 |
| 2008/0009324 | A1 * | 1/2008 | Patel ................... H04W 48/18 455/566 |
| 2008/0159133 | A1 * | 7/2008 | Yeung ................. H04W 28/10 370/230 |
| 2009/0106652 | A1 * | 4/2009 | Stluka ................... G06Q 10/06 715/273 |

FOREIGN PATENT DOCUMENTS

| JP | 2002-044729 A | 2/2002 |
| JP | 2006-148955 A | 6/2006 |
| KR | 2005-0003847 A | 1/2005 |
| WO | WO-2009059004 A2 | 5/2009 |

OTHER PUBLICATIONS

Extended European Search Report, Application No. 08844899.8, Date: Mar. 5, 2013, pp. 1-7.

* cited by examiner

*Primary Examiner* — Chuong A Ngo
(74) *Attorney, Agent, or Firm* — Norton Rose Fulbright US LLP

(57) ABSTRACT

Various embodiments are directed to a status indicator module to display a first signal strength and a second signal strength for different radio transmission signals using a single status indicator. Other embodiments are described and claimed.

24 Claims, 4 Drawing Sheets

GENERATE A STATUS INDICATOR HAVING A FIRST SIGNAL STRENGTH AND A SECOND SIGNAL STRENGTH FOR DIFFERENT RADIO TRANSMISSION SIGNALS
502

DISPLAY THE STATUS INDICATOR ON A DISPLAY
504

METHOD AND APPARATUS TO DISPLAY SIGNAL STRENGTH

BACKGROUND

A mobile computing device such as a combination handheld computer and mobile telephone or smart phone generally may provide voice and data communications functionality, as well as computing and processing capabilities. As the functionality of mobile computing devices continues to improve, the amount of content to be displayed increases. While the amount of content presented to a user in the display area of a mobile computing device continues to increase, the size of mobile computing devices continues to decrease. It is desirable, therefore, for mobile computing devices to use a reduced amount of display area to display both voice transmission signal strength and data transmission strength. Consequently, there exists a substantial need for techniques to improve the status indicator for displaying signal strength for mobile computing devices.

BRIEF DESCRIPTION OF THE DRAWINGS

FIG. 5 illustrates one embodiment of a logic flow.

DETAILED DESCRIPTION

Figure 1:
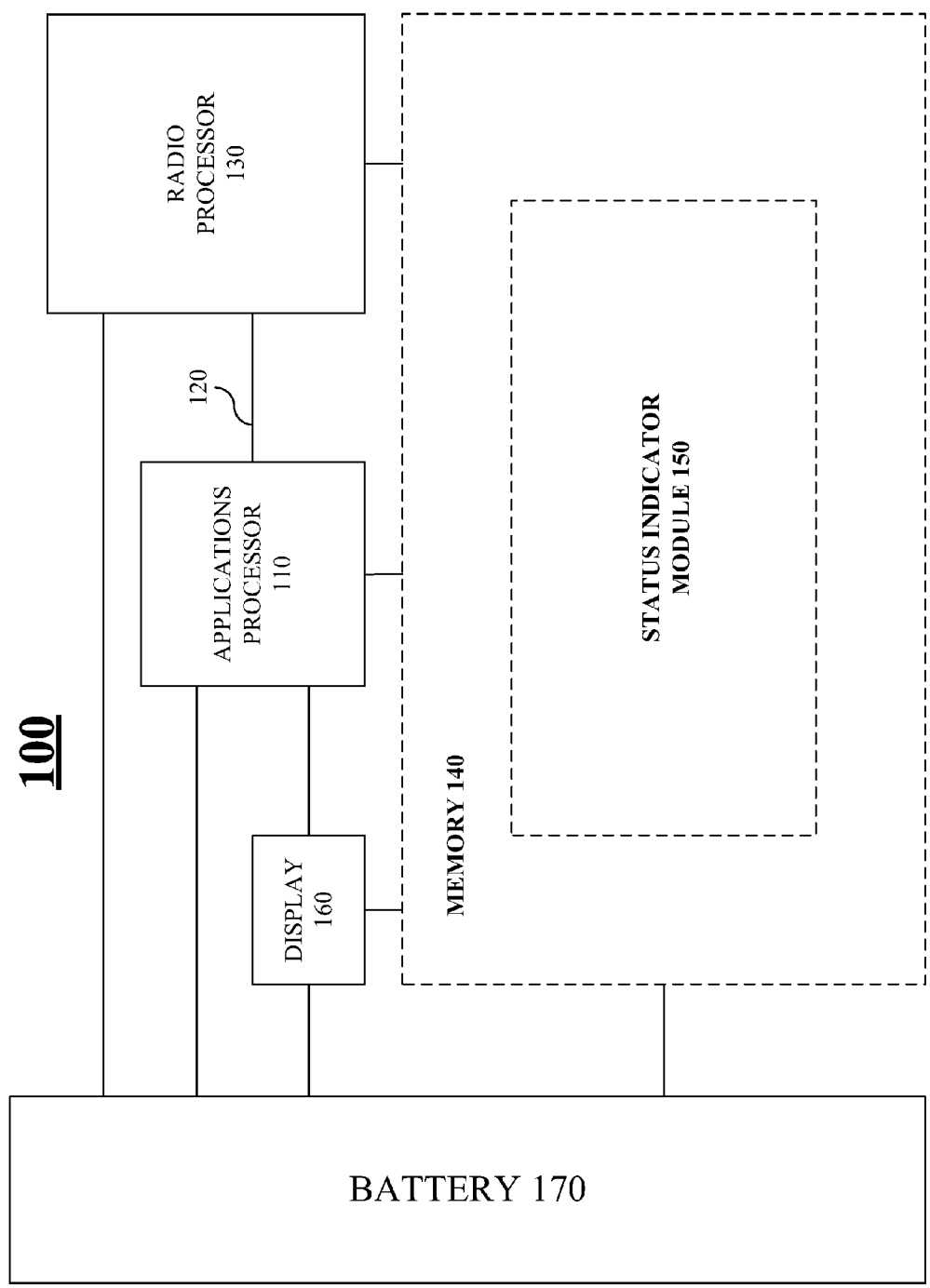
FIG. 1 illustrates one embodiment of a first mobile computing device.

Various embodiments may be generally directed to a method and apparatus to display signal strength. In one embodiment, for example, a mobile computing device may comprise a status indicator module coupled to a display. The status indicator module displays a first signal strength and a second signal strength for different radio transmission signals using a single status indicator on the display. In this manner, a user may be able to simultaneously view both voice transmission signal strength and data transmission signal strength using a single display indicator. Other embodiments are described and claimed.

Current solutions allow a user to view either voice transmission signal strength or data transmission signal strength in a single indicator, but do not allow a user to view both voice and data transmission signal strength at the same time using a single status indicator. Current solutions that utilize a signal status indicator switch between displaying voice transmission signal strength or data transmission signal strength. If a disparity exists between the voice and data transmission signal strength, a user's expectation of system performance may be affected based on the current solution because only half of the relevant information is being displayed at any time. For example, if voice transmission signal strength is strong and data transmission signal strength is weak, and only voice transmission signal strength is presented to a user via a signal status indicator, the user may be disappointed when, assuming that they have a strong connection based on the data presented by the single status indicator, they unsuccessfully attempt to utilize a data transmission connection.

Viewing both voice transmission signal strength and data transmission signal strength at the same time using current solutions requires two separate status indicators that take up valuable display area. As the amount of content presented to a user in the display area of mobile computing devices continues to increase and the size of mobile computing devices continues to decrease it becomes important to conserve display area. Therefore, various embodiments are directed to techniques to improve the status indicator for displaying signal strength for mobile computing devices.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of a mobile computing device 100. The mobile computing device 100 may be configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

In the illustrated embodiment shown in FIG. 1, the mobile computing device 100 may include an applications processor 110 and a radio processor 130, with the processors 110, 130 connected or coupled by a signal line 120. The mobile computing device 100 may further include a memory unit 140. The memory unit 140 may store or implement, among other software modules, a status indicator module 150. The mobile computing device 100 may also include a display 160. The applications processor 110, the radio processor 130, the memory 140 and the display 160 may all be coupled to a portable or self-contained power supply, such as a battery 170. It may be appreciated that the illustrated embodiment of the mobile computing device 100 as shown in FIG. 1 includes a limited number of elements for purposes of clarity and not limitation. A more detailed block diagram for the mobile computing device 100 may be described with reference to FIG. 6.

The mobile computing device 100 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 100 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 400 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

The mobile computing device 100 may comprise or implement a status indicator module 150. The status indicator module 150 may comprise, for example, hardware and/or software such as status indicator control logic (e.g., instructions, data, and/or code) to be executed by a logic device (e.g., host or applications processor 110). The logic may be stored internally or externally to the logic device on one or more types of computer-readable storage media. In one or more embodiments, the status indicator module 150 may be implemented as one or more status indicator application programming interface (API) commands on the applications processor 110. In some cases, however, the status indicator module 150 may be implemented or directly coupled to the radio processor 130. This may be advantageous, for example, when the mobile computing device 100 utilizes only a single processor. The embodiments are not limited in this context.

When enabled, the status indicator module 150 may be arranged to display a first signal strength and a second signal strength for different radio transmission signals using a single status indicator on the display 160. In various embodiments, the first signal strength may comprise a voice transmission signal strength and second signal strength may comprise a data transmission signal strength or vice-versa. Signal strength may also be referred to as received signal strength, received signal level, field strength or any other term known in the art. Signal strength is a measurement of the power present in a received radio signal. The first signal strength and the second signal strength may include any connection type capable of providing voice connectivity and data connectivity for mobile computing device 100. For example, the first signal strength may comprise a measurement of the power present in a GSM signal and the second signal strength may comprise a measurement of the power present in a GPRS signal. Other embodiments are described and claimed.

Figure 2:
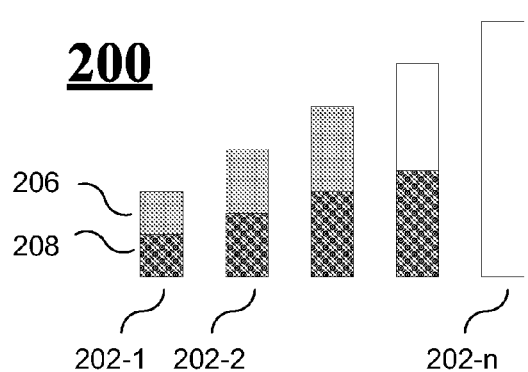
FIG. 2 illustrates one embodiment of a first status indicator.
Figure 3:
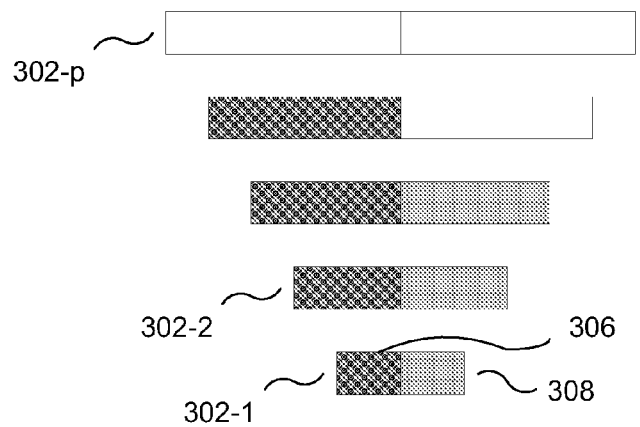
FIG. 3 illustrates one embodiment of a second status indicator.
Figure 4:
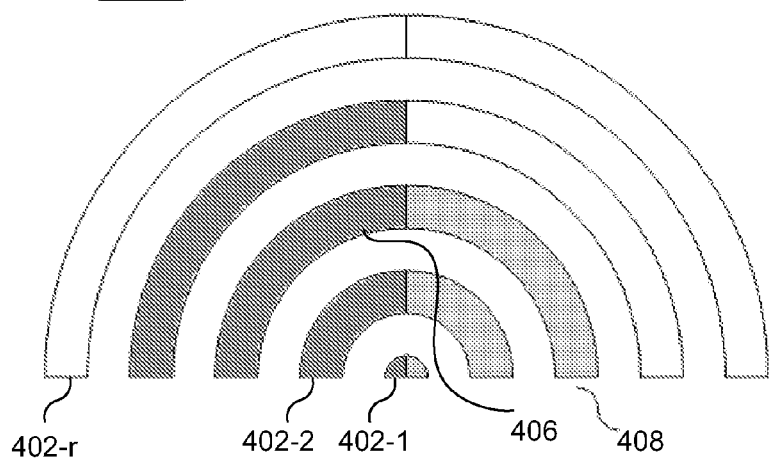
FIG. 4 illustrates one embodiment of a third status indicator.

In various embodiments, the status indicator may be a received signal strength indicator (RSSI). A RSSI indicates the intensity of the received signal and is displayed on display 160. Various embodiments of a status indicator are shown in FIGS. 2-4. While various embodiments of a status indicator are shown in FIGS. 2-4, it should be understood that these embodiments are presented by way of example only, and not limitation. It will be apparent to persons skilled in the relevant art that various changes in form and detail can be made therein without departing from the spirit and scope of the embodiments.

FIG. 2 illustrates one embodiment of a first status indicator. FIG. 2 illustrates a status indicator 200. As shown in FIG. 2, status indicator 200 comprises multiple display segments 202-1 to 202-n that visually change in proportion to changes in the first signal strength and the second signal strength. Each segment or segment portion may be configured to change a visual indicator, such as color or pattern, as signal strength changes. For example, a lower signal strength may be indicated by only segment 202-1 being highlighted and a higher signal strength may be indicated by each of segments 202-1 through 202-n being highlighted. While a limited number of segments are shown by way of example, it will be apparent to persons skilled in the relevant art that any number of segments can be used without departing from the spirit and scope of the embodiments.

Each segment 202-1 through 202-n may have a first portion 206 and a second portion 208. In various embodiments, the first portion 206 of each segment may be configured to display the first signal strength and the second portion 208 of each segment may be configured to display the second signal strength. Separating each segment into two separate portions allows status indicator 200 to display both the first signal strength and the second signal strength using a single status indicator on display 160, thereby avoiding the need to use additional display area and allowing the user to monitor multiple signal strengths at the same time.

As shown in FIG. 2, the first portion 206 of each segment may be vertically disposed above the second portion 208. To distinguish the first portion 206 and the second portion 208, the first portion 206 may be displayed in a first color or pattern and the second portion 208 may be displayed in a second color or pattern. For example, if the first signal strength is stronger than the second signal strength, first portion 206 of segments 202-1 through 202-n may be highlighted in a first color to indicate the first signal strength and second portion 208 of only segment 202-1 may be highlighted in a second color to indicate the second signal strength, for example. The embodiments are not limited to any specific color or pattern to distinguish the first portion 206 from the second portion 208.

FIG. 3 illustrates one embodiment of a second status indicator. FIG. 3 illustrates a status indicator 300. As shown in FIG. 3, status indicator 300 comprises multiple display segments 302-1 to 302-p that visually change in proportion to changes in the first signal strength and the second signal strength with each segment 302-1 through 302-p having a first portion 306 and a second portion 308. Unlike status indicator 200, first portion 306 of status indicator 300 may be horizontally disposed by second portion 308. While the functionality of status indicator 300 is similar to that described above with reference to status indicator 200, it is apparent that status indicator 300 has a different configuration and visual appearance. The alternative configuration of status indicator 300 may be desirable for certain implementations.

FIG. 4 illustrates one embodiment of a third status indicator. FIG. 4 illustrates a status indicator 400. As shown in FIG. 4, status indicator 400 comprises multiple display segments 402-1 to 402-r that visually change in proportion to changes in the first signal strength and the second signal strength with each segment 402-1 through 402-r having a first portion 406 and a second portion 408. Unlike status indicators 200 and 300, each segment 402-1 through 402-r may comprise a semicircle or other shape that incrementally increases in size with each segment to indicate increased signal strength. First portion 406 of status indicator 400 may be a first half of a segment 402-1 through 402-r and second portion 308 may comprise the remaining half of the segment. While the functionality of status indicator 400 is similar to that described above with reference to status indicators 200 and 300, it is apparent that status indicator 400 has a different configuration and visual appearance. The alternative configuration of status indicator 400 may be desirable for certain implementations.

Although FIGS. 2-4 describe exemplary arrangements of status indicators, it may be appreciated that any desired number of shapes and/or geometric arrangements may be used to convey multiple signal strengths using a single indicator. For example, a full circle may be used in an arrangement similar to that shown in FIG. 4, with one portion of each ring representing a first signal strength, and another portion of each ring representing a second signal strength. Furthermore, although some embodiments illustrate only two signal strengths using a single indicator, it may be appreciated that the single indicator or segments may be further divided into three or more portions to represent three or more corresponding signal strengths as desired for a given implementation. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 5 illustrates one embodiment of a logic flow. FIG. 5 illustrates a logic flow 500. Logic flow 500 may be representative of the operations executed by one or more embodiments described herein. As shown in logic flow 500, a status indicator having a first signal strength and a second signal strength for different radio transmission signals is generated at 502. At 504 the status indicator is displayed on a display. The first signal strength may comprise a voice transmission signal strength and the second signal strength may comprise a data transmission signal strength.

A status indicator having a first signal strength and a second signal strength for different radio transmission signals is generated at 502. For example, the status indicator may comprise any of the status indicators in FIGS. 2-4. In various embodiments, the first signal strength may comprise a voice transmission signal strength and the second signal strength may comprise a data transmission signal strength or vice-versa. For example, the first signal strength may comprise a GSM signal and the second signal strength may comprise a GPRS signal. Other embodiments are described and claimed.

At 504 the status indicator is displayed on a display. For example, any of the status indicators in FIGS. 2-4 may be displayed on a display such as display 160 in FIG. 1. In various embodiments, the status indicator is displayed in such a manner that it takes up a small amount of display area while still being easily perceived by a user. In various embodiments, the status indicator is displayed in a top portion of the display area along with other system content. For example, the status indicator may be displayed in the top left corner of the display area and a clock may be displayed in the top right hand corner of the display area. Other embodiments are described and claimed.

In various embodiments, the status indicator is divided into multiple display segments with each display segment visually changing in proportion to changes in the first signal strength and the second signal strength. For example, status indicator 200 is divided into multiple display segments 202-1 through 202-n. In various embodiments, each of the segments 202-1 through 202-n change color or pattern in proportion to changes in signal strength.

Each of the multiple display segments may be further divided to have a first portion and a second portion with the first signal strength being displayed in the first portion of each segment and the second signal strength being displayed in the second portion of each segment. For example, status indicator 300 includes segments 302-1 through 302-p, with each segment being divided into a first portion 306 and a second portion 308. In various embodiments, first portion 306 displays a first signal strength and second portion 308 displays a second signal strength. For example, first portion 306 may display voice transmission signal strength and second portion 308 may display data transmission signal strength. Other embodiments are described and claimed.

In various embodiments, the first portion of each segment may be disposed vertically above the second portion. For example, first portion 206 of segment 202-1 of status indicator 200 is disposed above second portion 208. The first signal strength may be displayed in the first portion of each segment using a first color and the second signal strength may be displayed in the second portion of each segment using a second color. For example, first portion 206 may be displayed in red and second portion 208 may be displayed in blue. In various embodiments, the first and second colors or patterns are selected to be contrasting colors or patterns to provide a clear distinction between the first portion and the second portion. Other embodiments are described and claimed.

In various embodiments, the first portion may be disposed horizontally by the second portion. For example, first portion 306 of segment 302-1 of status indicator 300 is disposed horizontally by second portion 308. In various embodiments, the first portion and second portion are displayed in easily distinguishable colors or patterns, regardless of their geometric configuration relative to one another. Other embodiments are described and claimed.

Figure 6:
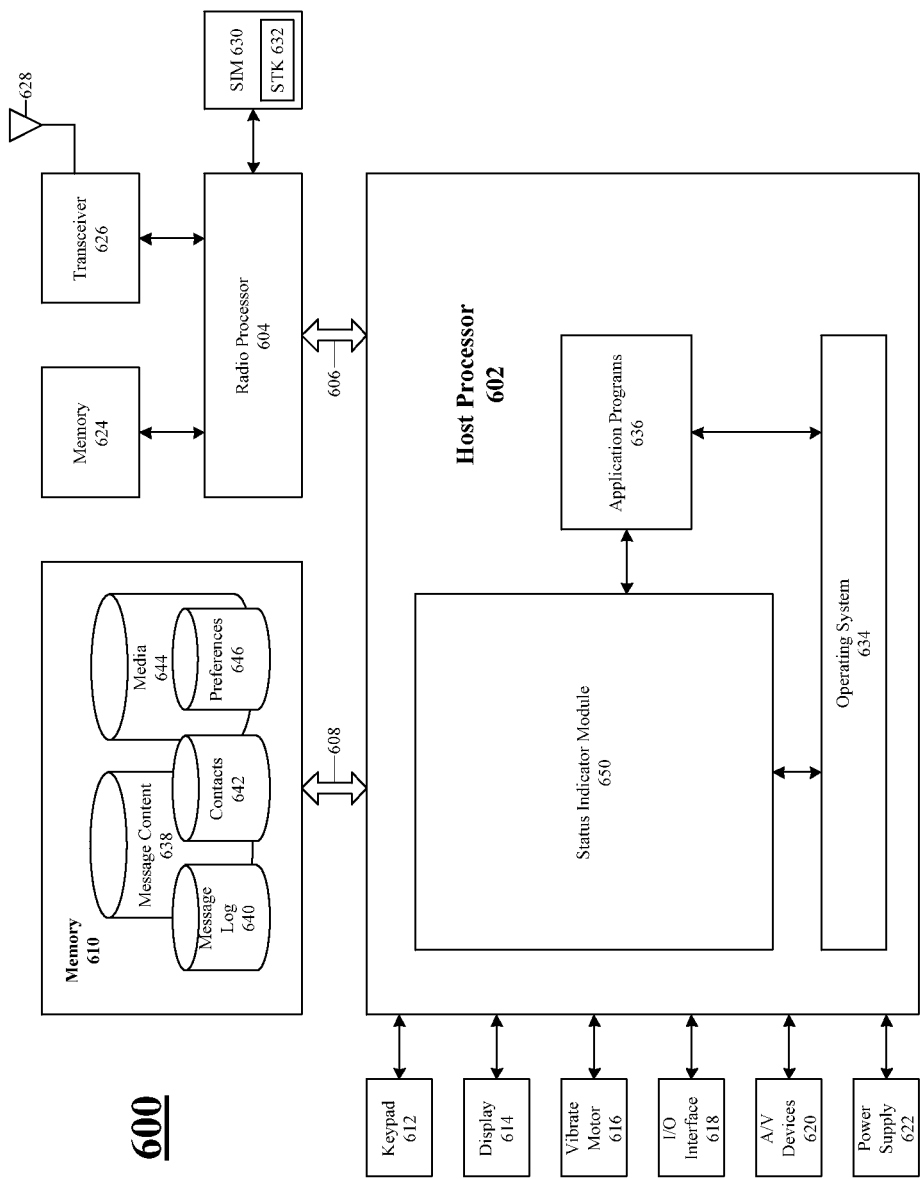
FIG. 6 illustrates one embodiment of a second mobile computing device.

FIG. 6 illustrates a block diagram of a mobile computing device 600 suitable for implementing various embodiments, including the mobile computing device 100. It may be appreciated that the mobile computing device 600 is only one example of a suitable mobile computing environment and is not intended to suggest any limitation as to the scope of use or functionality of the embodiments. Neither should the mobile computing device 600 be interpreted as having any dependency or requirement relating to any one or combination of components illustrated in the exemplary mobile computing device 600.

The mobile computing device 600 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 600 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 600 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 600 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 6, the mobile computing device 600 may comprise a dual processor architecture including a host processor 602 and a radio processor 604. In various implementations, the host processor 602 and the radio processor 604 may be arranged to communicate with each other using interfaces 606 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 602 may be responsible for executing various software programs such as system programs and applications programs to provide computing and processing operations for the mobile computing device 600. The radio processor 604 may be responsible for performing various voice and data communications operations for the mobile computing device 600 such as transmitting and receiving voice and data information over one or more wireless communications channels. Although the mobile computing device 600 is shown with a dual-processor architecture, it may be appreciated that the mobile computing device 600 may use any suitable processor architecture and/or any suitable number of processors in accordance with the described embodiments. In one embodiment, for example, the processors 602, 604 may be implemented using a single integrated processor.

The host processor 602 may be implemented as a host central processing unit (CPU) using any suitable processor or logic device, such as a general purpose processor. The host processor 602 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 602 may be coupled through a memory bus 608 to a memory 610. The memory bus 608 may comprise any suitable interface and/or bus architecture for allowing the host processor 602 to access the memory 610. Although the memory 610 may be shown as being separate from the host processor 602 for purposes of illustration, it is worthy to note that in various embodiments some portion or the entire memory 610 may be included on the same integrated circuit as the host processor 602. Alternatively, some portion or the entire memory 610 may be disposed on an integrated circuit or other medium (e.g., hard disk drive) external to the integrated circuit of the host processor 602. In various embodiments, the mobile computing device 600 may comprise an expansion slot to support a multimedia and/or memory card, for example.

The memory 610 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 600 may comprise an alphanumeric keypad 612 coupled to the host processor 602. The keypad 612 may comprise, for example, a QWERTY key layout and an integrated number dial pad. The mobile computing device 600 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 612 may comprise a physical keypad using hard buttons, or a virtual keypad using soft buttons displayed on a display 614.

The mobile computing device 600 may comprise a display 614 coupled to the host processor 602. The display 614 may comprise any suitable visual interface for displaying content to a user of the mobile computing device 600. In one embodiment, for example, the display 614 may be implemented by a liquid crystal display (LCD) such as a touch-sensitive color (e.g., 66-bit color) thin-film transistor (TFT) LCD screen. The touch-sensitive LCD may be used with a stylus and/or a handwriting recognizer program.

The mobile computing device 600 may comprise a vibrate motor 616 coupled to the host processor 602. The vibrate motor 616 may be enabled or disabled according to the preferences of the user of the mobile computing device 600. When enabled, the vibrate motor 616 may cause the mobile computing device 600 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 600 may comprise an input/output (I/O) interface 618 coupled to the host processor 602. The I/O interface 618 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 600 may be arranged to synchronize information with a local computer system.

The host processor 602 may be coupled to various audio/video (A/V) devices 620 that support A/V capability of the mobile computing device 600. Examples of A/V devices 620 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 602 may be coupled to a power supply 622 arranged to supply and manage power to the elements of the mobile computing device 600. In various embodiments, the power supply 622 may be implemented by a rechargeable battery, such as a removable and rechargeable lithium ion battery to provide direct current (DC) power, and/or an alternating current (AC) adapter to draw power from a standard AC main power supply.

The radio processor 604 may be arranged to communicate voice information and/or data information over one or more assigned frequency bands of a wireless communication channel. The radio processor 604 may be implemented as a communications processor using any suitable processor or logic device, such as a modem processor or baseband processor. The radio processor 604 may also be implemented as a digital signal processor (DSP), media access control (MAC) processor, or any other type of communications processor in accordance with the described embodiments. The radio processor 604 may perform analog and/or digital baseband operations for the mobile computing device 600. For example, the radio processor 604 may perform digital-to-analog conversion (DAC), analog-to-digital conversion (ADC), modulation, demodulation, encoding, decoding, encryption, decryption, and so forth.

The mobile computing device 600 may comprise a memory 624 coupled to the radio processor 604. The memory 624 may be implemented using any of the computer-readable media described with reference to the memory 610. The memory 624 may be typically implemented as flash memory and secure digital (SD) RAM. Although the memory 624 may be shown as being separate from the radio processor 604, some or all of the memory 624 may be included on the same IC as the radio processor 604.

The mobile computing device 600 may comprise a transceiver module 626 coupled to the radio processor 604. The transceiver module 626 may comprise one or more transceivers arranged to communicate using different types of protocols, communication ranges, operating power requirements, RF sub-bands, information types (e.g., voice or data), use scenarios, applications, and so forth. In various embodiments, the transceiver module 626 may comprise one or more transceivers arranged to support voice communications and/or data communications for the wireless network systems or protocols as previously described. In some embodiments, the transceiver module 626 may further comprise a Global Positioning System (GPS) transceiver to support position determination and/or location-based services.

The transceiver module 626 generally may be implemented using one or more chips as desired for a given implementation. Although the transceiver module 626 may be shown as being separate from and external to the radio processor 604 for purposes of illustration, it is worthy to note that in various embodiments some portion or the entire transceiver module 626 may be included on the same integrated circuit as the radio processor 604. The embodiments are not limited in this context.

The mobile computing device 600 may comprise an antenna system 628 for transmitting and/or receiving electrical signals. As shown, the antenna system 628 may be coupled to the radio processor 604 through the transceiver module 626. The antenna system 628 may comprise or be implemented as one or more internal antennas and/or external antennas.

The mobile computing device 600 may comprise a subscriber identity module (SIM) 630 coupled to the radio processor 604. The SIM 630 may comprise, for example, a removable or non-removable smart card arranged to encrypt voice and data transmissions and to store user-specific data for allowing a voice or data communications network to identify and authenticate the user. The SIM 630 also may store data such as personal settings specific to the user. In some embodiments, the SIM 630 may be implemented as an UMTS universal SIM (USIM) card or a CDMA removable user identity module (RUIM) card. The SIM 630 may comprise a SIM application toolkit (STK) 632 comprising a set of programmed commands for enabling the SIM 630 to perform various functions. In some cases, the STK 632 may be arranged to enable the SIM 630 to independently control various aspects of the mobile computing device 600.

As mentioned above, the host processor 602 may be arranged to provide processing or computing resources to the mobile computing device 600. For example, the host processor 602 may be responsible for executing various software programs including system programs such as operating system (OS) 634 and application programs 636. System programs generally may assist in the running of the mobile computing device 600 and may be directly responsible for controlling, integrating, and managing the individual hardware components of the computer system. The OS 634 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 600 may comprise other system programs such as device drivers, programming tools, utility programs, software libraries, application programming interfaces (APIs), and so forth.

Application programs 636 generally may allow a user to accomplish one or more specific tasks. In various implementations, the application programs 636 may provide one or more graphical user interfaces (GUIs) to communicate information between the mobile computing device 600 and a user. In some embodiments, application programs 636 may comprise upper layer programs running on top of the OS 634 of the host processor 602 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 636 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 600 may implement other types of applications in accordance with the described embodiments.

The mobile computing device 600 may include various databases implemented in the memory 610. For example, the mobile computing device 600 may include a message content database 638, a message log database 640, a contacts database 642, a media database 644, a preferences database 646, and so forth. The message content database 638 may be arranged to store content and attachments (e.g., media objects) for various types of messages sent and received by one or more messaging applications. The message log 640 may be arranged to track various types of messages which are sent and received by one or more messaging applications. The contacts database 642 may be arranged to store contact records for individuals or entities specified by the user of the mobile computing device 600. The media database 644 may be arranged to store various types of media content such as image information, audio information, video information, and/or other data. The preferences database 646 may be arranged to store various settings such as rules and parameters for controlling the operation of the mobile computing device 600.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. .sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device comprising:
    a display; and
    a status indicator logic device coupled to the display, wherein the status indicator logic device executes status indicator control instructions stored on a computer-readable storage media coupled to the status indicator logic device, to display a first signal strength for a first radio transmission signal and a second signal strength for a second radio transmission signal using a single status indicator on the display, the status indicator comprises multiple display segments, each display segment of the multiple display segments occupies a continuous area, and has a first segment portion directly visually connected to a second segment portion, the first segment portion of each display segment of the multiple display segments together are configured to display the first signal strength, the second segment portion of each display segment of the multiple display segments together are configured to display the second signal strength, the first segment portion of each display segment of the multiple display segments together are configured to visually change responsive to changes in the first signal strength, and the second segment portion of each display segment of the multiple display segments together are configured to visually change responsive to changes in the second signal strength.

2. The mobile computing device of claim 1, wherein the first signal strength comprises a voice transmission signal strength.

3. The mobile computing device of claim 1, wherein the second signal strength comprises a data transmission signal strength.

4. The mobile computing device of claim 1, wherein the status indicator represents a received signal strength indicator (RSSI).

5. The mobile computing device of claim 1, wherein the multiple display segments of the status indicator visually change in proportion to changes in the first signal strength and changes in the second signal strength.

6. The mobile computing device of claim 1, wherein the first segment portion of each display segment of the multiple display segments is vertically above the second segment portion of the each display segment.

7. The mobile computing device of claim 1, wherein the first segment portion of each display segment of the multiple display segments is horizontally next to the second segment portion of the each display segment.

8. The mobile computing device of claim 1, wherein the first segment portion of each display segment of the multiple display segments together are configured to display the first signal strength using a first color, and the second segment portion of each display segment of the multiple display segments together are configured to display the second signal strength using a second color.

9. A computer-implemented method, comprising:
    executing by a processor, one or more executable programs of instructions stored in a non-transitory computer-readable storage medium communicatively coupled to the processor, to generate a single status indicator to display a first signal strength for a first radio transmission signal and a second signal strength for a second radio transmission signal, wherein the status indicator comprises multiple display segments, each display segment of the multiple display segments occupies a continuous area, and has a first segment portion directly visually connected to a second segment portion, the first segment portion of each display segment of the multiple display segments together are configured to display the first signal strength, the second segment portion of each display segment of the multiple display segments together are configured to display the second signal strength, the first segment portion of each display segment of the multiple display segments together are configured to visually change responsive to changes in the first signal strength, and the second segment portion of each display segment of the multiple display segments together are configured to visually change responsive to changes in the second signal strength; and
    displaying the status indicator on a display coupled to the processor.

10. The method of claim 9, wherein the first signal strength comprises a voice transmission signal strength.

11. The method of claim 9, wherein the second signal strength comprises a data transmission signal strength.

12. The method of claim 9, wherein the status indicator represents a received signal strength indicator (RSSI).

13. The method of claim 9, wherein the multiple display segments of the status indicator visually change in proportion to changes in the first signal strength and changes in the second signal strength.

14. The method of claim 9, wherein the first segment portion of each display segment of the multiple display segments is vertically above the second segment portion of the each display segment.

15. The method of claim 9, wherein the first segment portion of each display segment of the multiple display segments is horizontally next to the second segment portion of the each display segment.

16. The method of claim 9, wherein the first segment portion of each display segment of the multiple display segments together are configured to display the first signal strength using a first color, and the second segment portion of each display segment of the multiple display segments together are configured to display the second signal strength using a second color.

17. A non-transitory computer-readable storage medium comprising instructions that, when executed by a processor, enable a system to:

generate a single status indicator to display a first signal strength for a first radio transmission signal and a second signal strength for a second radio transmission signal, wherein the status indicator comprises multiple display segments, each display segment of the multiple display segments occupies a continuous area, and has a first segment portion directly visually connected to a second segment portion, the first segment portion of each display segment of the multiple display segments together are configured to display the first signal strength, the second segment portion of each display segment of the multiple display segments together are configured to display the second signal strength, the first segment portion of each display segment of the multiple display segments together are configured to visually change responsive to changes in the first signal strength, and the second segment portion of each display segment of the multiple display segments together are configured to visually change responsive to changes in the second signal strength; and display the status indicator on a display of the system.

18. The non-transitory computer-readable storage medium of claim 17, wherein the first signal strength comprises a voice transmission signal strength.

19. The non-transitory computer-readable storage medium of claim 17, wherein the second signal strength comprises a data transmission signal strength.

20. The non-transitory computer-readable storage medium of claim 17, wherein the status indicator represents a received signal strength indicator (RSSI).

21. The non-transitory computer-readable storage medium of claim 17, wherein the multiple display segments of the status indicator visually change in proportion to changes in the first signal strength and changes in the second signal strength.

22. The non-transitory computer-readable storage medium of claim 17, wherein the first segment portion of each display segment of the multiple display segments is vertically above the second segment portion of the each display segment.

23. The non-transitory computer-readable storage medium of claim 17, wherein the first segment portion of each display segment of the multiple display segments is horizontally next to the second segment portion of the each display segment.

24. The non-transitory computer-readable storage medium of claim 17, wherein the first segment portion of each display segment of the multiple display segments together are configured to display the first signal strength using a first color, and the second segment portion of each display segment of the multiple display segments together are configured to display the second signal strength using a second color.

* * * * *